March 6, 1962  R. C. ARENS ET AL  3,023,484
DEVICE FOR STRIPPING AND WINDING INSULATED CONDUCTORS
Filed Dec. 17, 1959  2 Sheets-Sheet 1
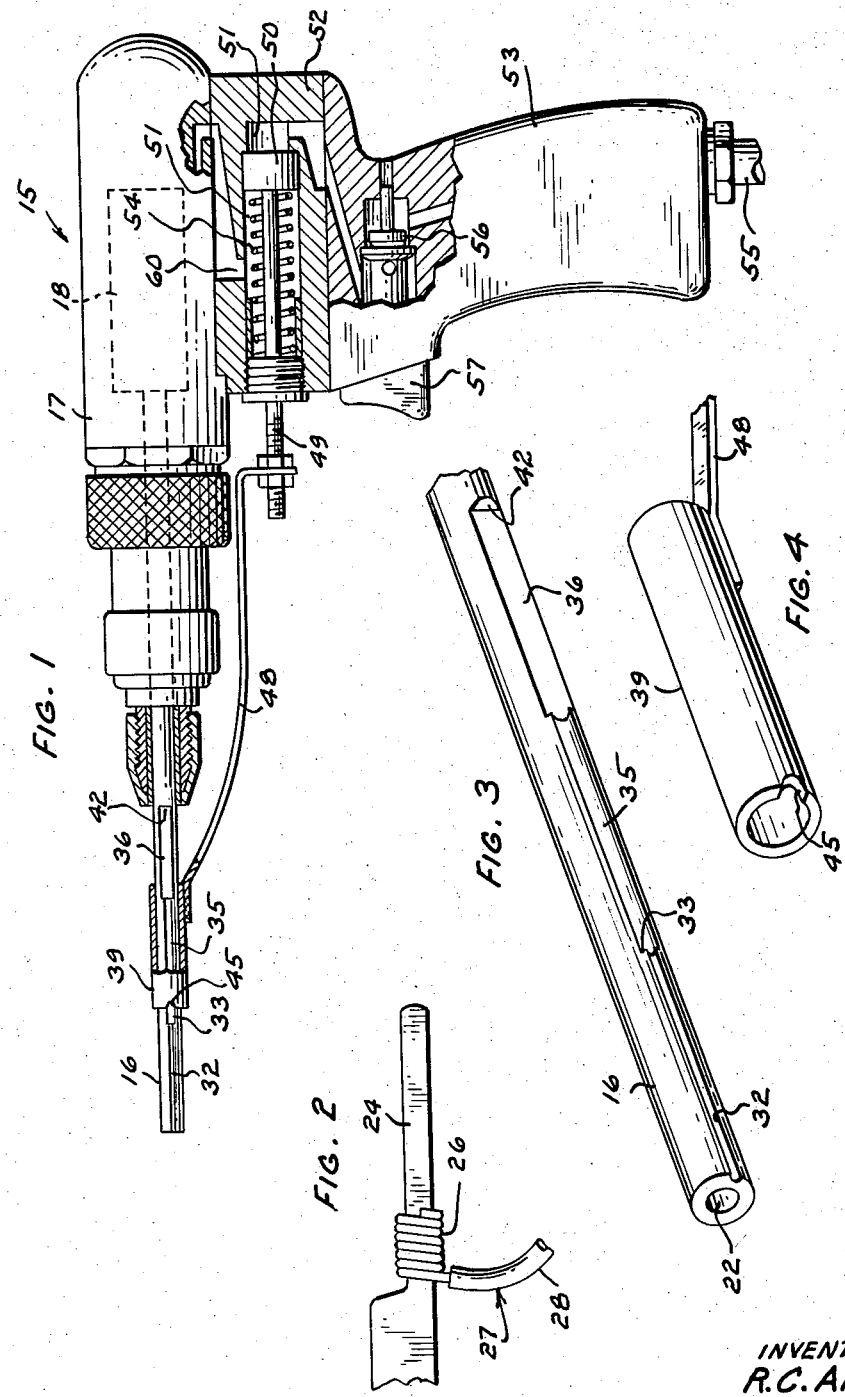
INVENTORS
R.C. ARENS
A.C. KIPPER
BY A.G. Schwartz, Jr.
ATTORNEY

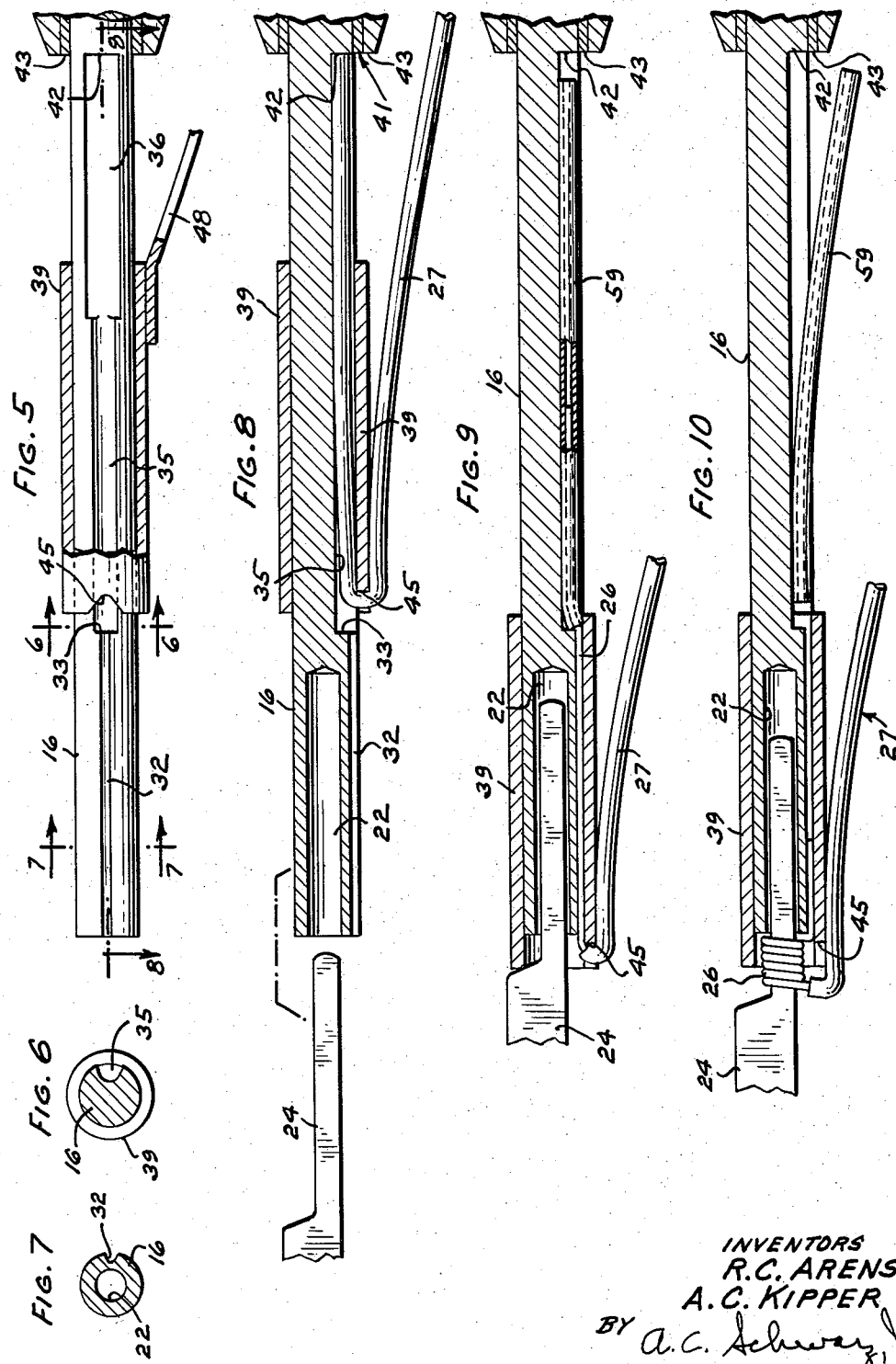

3,023,484
Patented Mar. 6, 1962

3,023,484
DEVICE FOR STRIPPING AND WINDING INSULATED CONDUCTORS
Robert C. Arens, Oklahoma City, Okla., and Alfred C. Kipper, Western Springs, Ill., assignors to Western Electric Company, Incorporated, New York, N.Y., a corporation of New York
Filed Dec. 17, 1959, Ser. No. 860,281
3 Claims. (Cl. 29—33)

This invention relates to a device for stripping and winding insulated conductors, and more particularly to a power actuated hand tool for stripping a section of insulation from an insulated conductor and winding the stripped conductor about a terminal.

An object of the invention is to provide an improved device for stripping and winding insulated conductors.

Another object of the invention is to provide a device for stripping the insulation from a portion of an insulated conductor.

A further object of the invention is the provision of a power actuated hand tool having a mechanism for stripping a portion of the insulation from an insulated conductor, a mechanism for winding the conductor about a terminal and control means for effecting the sequential operation of said mechanisms.

With these and other objects in view, the invention contemplates the provision of a driving bit rotatably mounted in and extending from a housing and driven by an air motor. The bit has a concentric recess in one end thereof for receiving the terminal, a first peripheral groove of a size slightly larger than the wire of said conductor extending from the front end of the bit, a second longitudinal peripheral groove disposed in alignment with said first groove for receiving an insulated conductor therein, and a shoulder formed at the juncture of said grooves having sharp edges for severing the sheath of insulation of the insulated conductor.

A stripping sleeve is slidably mounted on the bit and has a normal retracted position with the first groove and a portion of the second groove uncovered so that a predetermined length of the end portion of the conductor may be inserted between the sleeve and the second groove and the rest of the conductor bent around the end of the sleeve and directed rearwardly thereof. The sleeve is then advanced and carries the insulated conductor into engagement with the shoulder where the forward end of the sleeve in cooperation with the shoulder severs the sheath of insulation which severed sheath is held by the shoulder against longitudinal movement as the wire is withdrawn therefrom by the advancing sleeve and carried to a winding position with a portion of the stripped wire disposed beyond the end of the bit in close proximity to the terminal. At this time rotation is imparted to the bit to cause successive portions of the stripped wire to be wound onto the terminal.

Other objects and advantages will become apparent by reference to the following detailed description thereof and the accompanying drawings illustrating a preferred embodiment of the invention wherein:

FIG. 1 is a side elevational sectional view of the device for stripping and winding insulated conductors embodying the present invention;

FIG. 2 is an enlarged fragmentary view of a terminal with a stripped portion of an insulated conductor wound thereon;

FIG. 3 is an enlarged fragmentary perspective view of the winding bit;

FIG. 4 is a perspective view of the stripping sleeve;

FIG. 5 is an enlarged fragmentary elevational sectional view of the device showing the winding bit and the stripping sleeve thereon in retracted position;

FIGS. 6 and 7 are transverse cross sectional views of the device taken on lines 6—6 and 7—7, respectively, of FIG. 5;

FIG. 8 is a longitudinally sectional view through the device taken along the line 8—8 of FIG. 5 and showing a conductor threaded between the stripping sleeve and the bit and a portion of a terminal in aligned and juxtaposed relation thereto;

FIG. 9 is a view similar to FIG. 8 showing the terminal inserted in the winding bit and the stripping sleeve in its advanced position; and FIG. 10 is a view similar to FIG. 9 showing the parts thereof in different position and with the wire partially wound onto the terminal.

Referring to the drawings, the present stripping and winding device 15 comprises an elongated cylindrical winding bit 16 rotatably mounted in an extending from a housing 17 and connected to and driven by an air motor 18 within the housing. At its outer end the winding bit 16 has a concentric cylindrical recess 22 for receiving an end portion of a terminal 24 about which a wire 26 of an insulated conductor 27 is adapted to be wound. The wire 26 is normally covered with a sheath of insulation 28.

The winding bit 16 is provided with a peripheral longitudinally disposed groove 32 that extends from the forward end thereof and is of a size slightly larger than the wire 26. The groove 32 terminates in a shoulder 33 which is disposed at right angles to the axis of the bit and forms sharp cutting edges at the end of the groove for shearing the insulation 28 of the conductor 27. Clearance in the form of an enlarged groove 35 and a flattened portion 36 is provided along one side of the bit 16 in alignment with the groove 32 for receiving a portion of the insulated conductor 27 therein.

A stripping sleeve 39 is slidably mounted on the bit 16 for movement to and from a normal retracted position shown in FIGS. 1, 5 and 8 and a forward position shown in FIGS. 9 and 10. In its forward position the sleeve 39 covers the groove 32 and cooperates therewith to form a restricted passageway or aperture for receiving only the wire 26 therein. In its retracted position the sleeve 39 is spaced longitudinally from the shoulder 33 to uncover the groove 32 and a portion of the groove 35 so that an end portion of a conductor 27 may be threaded into the groove 35 between the bit 16 and the sleeve 39 and moved longitudinally of the bit until the end of the conductor 27 engages a suitable stop 41. The stop 41 is formed in part by a shoulder 42 on the bit 16 and by the end surface 43 of a portion of the housing 17.

The conductor 27 is then bent in a horizontal plane about the end of the sleeve 39 and directed rearwardly toward the housing 17 of the device as shown in FIG. 8. A notch 45 is formed in the forward end of the stripping sleeve 39 for receiving the bent portion of the conductor 27 therein to facilitate the positioning of the conductor and prevent the displacement thereof from the sleeve during the initial portion of the winding operation.

A rigid link 48 interconnects the stripping sleeve 39 and a rod 49 of a piston 50 that is reciprocable in a cylinder 51 in a block 52. This block forms a portion of the housing 17 and has a handle 53 extending downwardly therefrom by means of which the device 15 may be gripped. A spring 54 in the cylinder 51 returns the piston 50 and the stripping sleeve 39 to their normal retracted positions. The piston 50 and the stripping sleeve 39 are moved forward by compressed air from an air line 55, the air being admitted to the cylinder 51 under control of a valve 56 which is actuated by a manually operable trigger 57.

As the stripping sleeve 39 is moved to its forward position it carries the insulated conductor 27 with it into engagement with the shoulder 33 of the winding bit, and the forward end of the sleeve in cooperation with the cutting edges on the shoulder 33 shears the sheath of insulation 28 and severs a section 59 thereof. The section 59 of insulation is held against advancing movement by the shoulder 33 as the wire 26 is withdrawn therefrom by the advancing sleeve 39. The sleeve carries the insulated conductor 27 with it and advances the bared wire 26 along the groove 32 to a winding position with a portion of the wire positioned beyond the end of the bit 16 in juxtaposed relation to the terminal 24 as shown in FIG. 9.

As the sleeve 39 reaches its forward position the piston 50 uncovers a port 60 through which the compressed air flows to actuate the air motor 18 and effect the rotation of the winding bit 16. In response to rotation of the bit 16, successive portions of the bared wire 26 are wound around the terminal 24 thereby causing the remainder of the wire 26 being rotated by the bit to be advanced along the groove 32 and be withdrawn from the severed section of insulation 59 until all of the wire 26 is wound around the terminal. During the winding operation, the severed section of insulation 59 is ejected by centrifugal force from the winding bit 16.

In the operation of stripping and winding an insulated conductor 27 onto a terminal, an operator grasps the handle 53 and supports the device 15 in one hand and with his other hand inserts the end of the insulated conductor 27 between the stripping sleeve 39 and the bit 16 and moves it longitudinally until the end of the insulated conductor engages the stop 41 after which he bends the insulated conductor sideways to seat a portion thereof in the notch 45 of the stripping sleeve 39 and to direct the adjoining portion rearwardly toward the housing 17 as shown in FIG. 9. The operator then moves the device 15 toward the terminal 24 and telescopes the end of the bit 16 thereover after which he presses the trigger 57 to effect the actuation of the piston 50 and the forward movement of the stripping sleeve 39.

During this forward movement of the sleeve 39 the insulated conductor is carried along with it and the sheath of insulation 28 is sheared by the shoulder 33 and the severed section 59 of insulation is stripped by the shoulder from the wire 26 as a portion of the bared wire is advanced beyond the end of the winding bit to a winding position (FIG. 9) at which time rotation is imparted to the bit 16 causing it to wind successive portions of stripped wire 26 around the terminal 24. On completion of the winding operation, the trigger 57 is released to stop the rotation of the bit 16 and the device 15 is removed from the terminal.

It is to be understood that the above-described arrangements are simply illustrative of the application of the principles of this invention. Numerous other arrangements may be readily devised by those skilled in the art which will embody the principles of the invention and fall within the spirit and scope thereof.

What is claimed is:

1. In a device for stripping insulation from the conductor of an insulated conductor and winding the conductor onto a terminal, a housing, a cylindrical bit rotatably mounted in the housing and extending therefrom, said bit having a concentric recess at one end thereof for receiving the terminal and having a longitudinally directed peripheral groove therein extending from said one end and of a size slightly larger than the conductor for receiving the conductor therein, said bit having a shoulder at the end of said groove and a recess extending longitudinally therefrom for receiving the insulated conductor beside the bit within the projected periphery of the bit, a sleeve slidably mounted on the bit for movement to a forward position with the forward end thereof positioned beyond the end of said bit and to a retracted position with said end of the sleeve in longitudinally spaced relation to said groove and said shoulder to permit the positioning of an insulated conductor between said sleeve and said bit and around the end of said sleeve, said shoulder having edges thereon cooperable with the end of said sleeve for severing the insulation of said insulated conductor, a fluid operated actuator including a piston and a cylinder mounted on said housing for moving said sleeve from said retracted position to said forward position to advance the conductor to a winding position with a portion thereof in juxtaposed relation to the terminal and to effect the stripping of a section of insulation from the conductor, a fluid operated motor on said housing for rotating said bit, means for directing fluid under pressure to one end of said cylinder to effect the actuation of said piston and said sleeve to forward positions and to direct said fluid to said motor in response to movement of said piston to said forward position.

2. A device for stripping insulated conductors and winding them onto terminals comprising, a housing, a cylindrical bit rotatably supported in the housing and extending therefrom, said bit having a concentric recess in one end thereof for receiving the terminal and having a longitudinally disposed recess along one side for receiving the insulated conductor therein and provided with a stripping shoulder at one end of said longitudinally disposed recess, said bit also having a longitudinally disposed peripheral groove extending from said stripping shoulder to said one end of the bit of a size slightly greater than the conductor for receiving the conductor therein, a sleeve slidably mounted on said bit for movement from a forward position with the forward end thereof disposed beyond the end of the bit and to a retracted position in spaced relation to said groove and said stripping shoulder whereby an insulated conductor may be inserted in said peripheral recess between the sleeve and said bit and bent around the end of said sleeve, said end of the sleeve cooperating with said stripping shoulder to shear the insulation of the insulated conductor and to cause said stripping shoulder to strip the insulation from the conductor, an air motor in said housing for rotating said bit, said housing having a cylinder and a piston reciprocable therein, means for connecting said sleeve to said piston for movement therewith, resilient means for moving said piston to a normal retracted position, and means on said housing for admitting compressed air from a supply thereof into one end of said cylinder for moving said piston to an advanced position, said housing having a port uncovered by the movement of said piston to said advanced position for directing the compressed air to said air motor to effect the rotation of said bit, said piston in its normal retracted position serving to cut off the supply of compressed air to said air motor.

3. In a device of the type described, a bit for winding a conductor around a terminal, a housing for rotatably supporting said bit, a fluid operated motor mounted on said housing for rotating said bit, a sleeve slidably mounted on said bit and cooperable therewith for stripping the insulation from an insulated conductor, a fluid operated actuator mounted on said housing including a stationary cylinder and a piston movable in said cylinder from a normal retracted position to an advanced position for actuating said stripping sleeve, means on said housing for directing fluid under pressure from a source thereof to one end of said cylinder to move said piston from the retracted position to the advanced position and for directing the fluid from said cylinder to said motor in response to movement of said piston to said advanced position, and valve means for controlling the flow of the fluid to said cylinder.

References Cited in the file of this patent

UNITED STATES PATENTS

| | | |
|---|---|---|
| 2,743,502 | Reck | May 1, 1956 |
| 2,743,503 | Mallina | May 1, 1956 |
| 2,884,685 | Bos | May 5, 1959 |
| 2,885,764 | Shulters | May 12, 1959 |

FOREIGN PATENTS

| | | |
|---|---|---|
| 544,892 | Belgium | Aug. 1, 1956 |
| 157,868 | Sweden | Feb. 19, 1957 |